US007783721B2

(12) United States Patent
McCollum et al.

(10) Patent No.: US 7,783,721 B2
(45) Date of Patent: *Aug. 24, 2010

(54) METHOD AND CODE MODULE FOR ADDING FUNCTION TO A WEB PAGE

(75) Inventors: Charles P. McCollum, Phoenix, AZ (US); Andrew L. Burgess, Jr., Desert Hills, AZ (US)

(73) Assignee: Augme Technologies, Inc., New York, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 11/899,265

(22) Filed: Sep. 4, 2007

(65) Prior Publication Data

US 2008/0034062 A1      Feb. 7, 2008

Related U.S. Application Data

(60) Continuation of application No. 11/888,865, filed on Aug. 3, 2007, which is a division of application No. 10/612,480, filed on Jul. 1, 2003, now Pat. No. 7,269,636, which is a continuation of application No. 09/429,357, filed on Oct. 28, 1999, now Pat. No. 6,594,691.

(51) Int. Cl.
  *G06F 15/16*   (2006.01)
(52) U.S. Cl. ..................................... 709/218
(58) Field of Classification Search .................. 709/218
  See application file for complete search history.

(56) References Cited

U.S. PATENT DOCUMENTS

| 5,796,952 | A | * | 8/1998 | Davis et al. | .................. 709/224 |
| 5,845,075 | A | | 12/1998 | Uhler et al. | |
| 5,903,727 | A | | 5/1999 | Nielsen | |
| 5,914,941 | A | * | 6/1999 | Janky | .......................... 370/313 |
| 5,923,885 | A | | 7/1999 | Johnson et al. | |
| 5,978,488 | A | * | 11/1999 | Margolin | ...................... 381/61 |
| 6,009,410 | A | | 12/1999 | Lemole et al. | |
| 6,028,984 | A | * | 2/2000 | Kimball | ...................... 709/249 |

(Continued)

OTHER PUBLICATIONS

"Information Bulletin: Internet Cookies" U.S. Department of Energy Computer Incident Advisory Capability, Mar. 12, 1998.

(Continued)

*Primary Examiner*—Wing F Chan
*Assistant Examiner*—Tesfay Yohannes
(74) *Attorney, Agent, or Firm*—Meschkow & Gresham, P.L.C.

(57) ABSTRACT

A computer network (20) includes a first processor (22) for maintaining a Web page (34) having an embedded first code module (36) and accessible through a Web address (38). A second processor (24) supports a Web browser (52) for downloading the Web page (34) and executing the first code module (36). When executed, the first code module (36) issues a first command (93) to retrieve a second code module (90) from a server system (26). The server system (26) includes a database (68) having a service response (162, 176, 186) associated with the Web address (38). A processor (62) assembles the second code module (90) having the service response (162, 176, 186). When the second code module is retrieved, the first code module (36) issues a second command (106) to initiate execution of the second code module (90) to provide added function to the Web page (34).

9 Claims, 11 Drawing Sheets

U.S. PATENT DOCUMENTS

| | | | |
|---|---|---|---|
| 6,112,240 | A | 8/2000 | Pogue et al. |
| 6,128,655 | A | 10/2000 | Fields et al. |
| 6,212,564 | B1 | 4/2001 | Harter et al. |
| 6,266,681 | B1 | 7/2001 | Guthrie |
| 6,304,893 | B1 | 10/2001 | Gish |
| 6,317,761 | B1 | 11/2001 | Landsman et al. |
| 6,327,609 | B1 | 12/2001 | Ludewig et al. |
| 6,389,463 | B2 * | 5/2002 | Bolas et al. ............. 709/219 |
| 6,396,472 | B1 * | 5/2002 | Jacklin ................ 345/104 |
| 6,401,134 | B1 | 6/2002 | Razavi et al. |
| 6,415,319 | B1 | 7/2002 | Ambroziak |
| 6,477,550 | B1 | 11/2002 | Balasubramaniam |
| 6,487,585 | B1 * | 11/2002 | Yurkovic ............... 709/206 |
| 6,516,338 | B1 | 2/2003 | Landsman et al. |
| 2002/0138843 | A1 * | 9/2002 | Samaan et al. ............ 725/87 |
| 2003/0016241 | A1 * | 1/2003 | Burke ................. 345/733 |
| 2004/0068536 | A1 * | 4/2004 | Demers et al. ........... 709/201 |
| 2004/0128199 | A1 * | 7/2004 | Cusack et al. ............ 705/16 |
| 2004/0143591 | A1 * | 7/2004 | Onyeabor ............. 707/102 |
| 2005/0108626 | A1 | 5/2005 | Ong |
| 2005/0184994 | A1 * | 8/2005 | Suzuoki et al. ........... 345/502 |
| 2007/0100956 | A1 * | 5/2007 | Kumar ................ 709/217 |

OTHER PUBLICATIONS

"RealThings Design Guide" IBM, 1998.

Baker, James, Algorithm animation over the world wide web, AVI 1996, Gubbio Italy.

* cited by examiner

| LINE NO. | $\underbrace{\phantom{xxxx}}_{93}$ CODE |
|---|---|
| 1 | <script src= 'http://bslserver.domainname.com/ cgi-bin/bslservercall.cgi'>　←—94 |
| 2 | </script> |
| 3 | <script><!-- —102 |
| 4 | BSLStart (); —106 |
| 5 | //--></script> —102 |

92 → row 1, 98 → row 2, 100 → row 3, 104 → row 4, 108 → row 5

| WEB ADDRESS FIELD 150 | PROFILE FIELD 152 | SERVICE RESPONSE 162 FIELD 154 | PARAMETER SET FIELD 156 |
|---|---|---|---|
| URL 1 160 | RECREATION/ GOLF | DENIAL OF 176 SERVICE | DENIAL CONTENT 164 |
| URL 2 174 | TEXAS COOKING | CONDITIONAL 186 SERVICE | CONDITIONAL CONTENT 178 (INCLUDING URL 5) 240 |
| URL 3 184 | WEDDING | PREDETERMINED 186 SERVICE | PREDETERMINED CONTENT 188 |
| URL 4 | FOOTBALL 234 | PREDETERMINED SERVICE (FLAG- 176 CONDITIONAL SERVICE FOR TRACKING INDEX 60) | PREDETERMINED CONTENT 236 188 |
| ⋮ | | ⋮ | |
| URL n | | • | |

FIG. 7    68

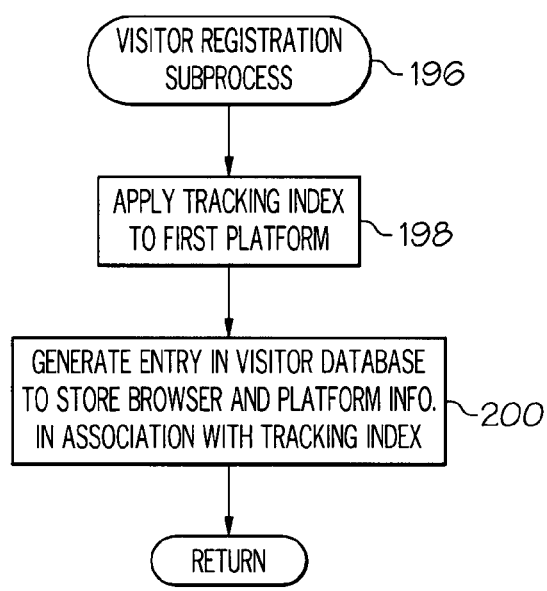

FIG. 8

| TRACKING INDEX | BROWSER ID | PLATFORM ID | VISITOR PREFERENCES |
|---|---|---|---|
| SECOND PLATFORM | BROWSER INFO | PLATFORM INFO | VISITOR SPECIFIED PARAMETER SET |
| | 56 | 58 | |
| | | | |
| | | | |
| | | | |
| | | | |
| | | | |

FIG. 9

METHOD AND CODE MODULE FOR ADDING FUNCTION TO A WEB PAGE

RELATED INVENTION

The present invention is a continuation of "Appliance Metaphor For Adding Media Function To A Web Page," U.S. patent application Ser. No. 11/888,865, filed 3 Aug. 2007, which is a divisional of "Method and Code Module For Adding Function To A Webpage," U.S. patent application Ser. No. 10/612,480, filed 1 Jul. 2003, which is a continuation of "Method And System For Adding Function To A Web Page," U.S. patent application Ser. No. 09/429,357, filed 28 Oct. 1999, now U.S. Pat. No. 6,594,691, all of which are incorporated by reference herein.

TECHNICAL FIELD OF THE INVENTION

The present invention relates to the field of computer networks. More specifically, the present invention relates to methods and systems for adding function to Web pages that are accessible through the Internet.

BACKGROUND OF THE INVENTION

The worldwide network of computers commonly referred to as the "Internet" has seen explosive growth in the last several years. The Internet is expected to evolve with the adaptation of new forms of interactive technology applied to the basic Internet infrastructure which consists of many elements, not the least of which are the Web browser and Web page.

Groups of Web pages, forming Web sites, are evolving to a high level of sophistication at an staggering rate. Small to large corporations are taking advantage of this trend, and electronic commerce (E-Commerce), that is, business transactions taking place over the Internet is advancing at a rapid pace. It is highly desirable for those who would like to carry out commerce on the Internet to have a very sophisticated Web site that can perform numerous functions and services to an increasingly sophisticated class of Web site visitors. Such Web sites may desirably include such information services as searchable databases for price, stock, shipping, etc.; product information; competitive comparisons, and so forth.

In order for such information services to be successfully communicated to potential customers, it is imperative to garner the interest of large numbers of Internet users. As with more traditional forms of commerce, advertising plays an important role in attracting customers. Accordingly, what is needed is economical, yet effective, advertising and publicity in order to attract the interest of Internet users.

A recent advance in Web site technology is the addition of streaming media, as well as other more sophisticated functional enhancements, to Web sites. The concept of streaming media is defined broadly as audio and video being delivered to a Web site visitor in packets over the Internet. The streaming media can be delivered so quickly that audio sounds and/or graphic images can be heard and seen almost immediately, comparable in quality to commercial, over-the-air radio or television. Some examples of streaming media include banners, informational feeds using a "marquee", audio based commercials, and so forth.

Unfortunately, it is expensive to add such enhancements to Web sites. Bandwidth costs for delivering streaming media may be prohibitively expensive. In addition, there are problems associated with the complexity of producing the streaming media that is to be "broadcast" over the Web sites, and licensing of the streaming media if it is proprietary.

A typical example of adding function to a Web site is the addition of an "affiliate" program. An affiliate program, provided by a third party may be desired by the Web site developer to add functionality to their Web site for the purpose of enhancing the appeal of the site or for revenue sharing in which they will receive a percentage of sales. In order to obtain such an affiliate program, the Web site developer may be required to register with the supplier of the affiliate program in order to obtain and execute the affiliate program in connection with his/her Web site. Unfortunately, such a registration process typically requires the Web site developer to fill out lengthy on-line electronic forms. Such forms may be cumbersome and so frustrating, that filling out such forms leads to their abandonment on the part of the Web site developer. If the Web site developer successfully manages to register, the Web site developer must then wait for the implementing code for the affiliate program to be e-mailed to him/her. Once the Web site developer receives the implementing code, the code is then copied and pasted onto the HyperText Markup Language (HTML) for the Web site where desired.

Unfortunately, universal capability with the Web browsers that subsequently access the Web site with the enhanced function provided by the affiliate program is limited. That is, even though a Web site developer has successfully added the implementing code for the affiliate program, all Web browsers accessing the Web site may not be able to interpret the affiliate program and the Web site visitor may not be able to experience the added function.

SUMMARY OF THE INVENTION

Accordingly, it is an advantage of the present invention that a method and system for adding function to a Web page are provided.

It is another advantage of the present invention that a method and system are provided that are compatible with Web browsers which adhere to the standards for HyperText Transfer Protocol (HTTP).

It is another advantage of the present invention that a method and system are provided that add function to a Web page through an easily distributed software code module.

It is yet another advantage of the present invention that a method and system are provided that deliver services by client demand that are specific to predetermined parameters.

The above and other advantages of the present invention are carried out in one form by a method of operating a computer network to add function to a Web page. The method calls for downloading the Web page at a processor platform. When the Web page is downloaded, automatically executing a first code module embedded in the Web page. The first code module issues a first command to retrieve a second code module, via a network connection, from a server system, and the first code module issues a second command to initiate execution of the second code module at the processor platform.

The above and other advantages of the present invention are carried out in another form by a computer readable code module for adding function to a Web page. The code module is configured to be embedded in the Web page which is generated in a HyperText Markup Language (HTML), and is configured for automatic execution when the Web page is downloaded to a client machine supporting a graphical user interface and a Web browser. The computer readable code module includes means for communicating a Web address of the Web page to a server system via a network connection to initiate a download of a second computer readable code module to the client machine. The computer readable code module further includes means for communicating first information characterizing said Web browser to said server and means for communicating second information characterizing said client machine to said server. In addition, the computer readable code module includes means for initiating execution of said second computer readable code module following the download of the second computer readable code module and means for providing a comment tag informing the Web browser to ignore the initiating means.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows an exemplary computer readable code module in accordance with the preferred embodiment of the present invention;

FIG. 7 shows a Web address database generated by a server system of the computer network;

FIG. 8 shows a visitor registration subprocess of the service response provision process;

FIG. 9 shows a visitor database generated by the server system of the computer network;

DETAILED DESCRIPTION OF THE PREFERRED EMBODIMENTS

Figure 1:
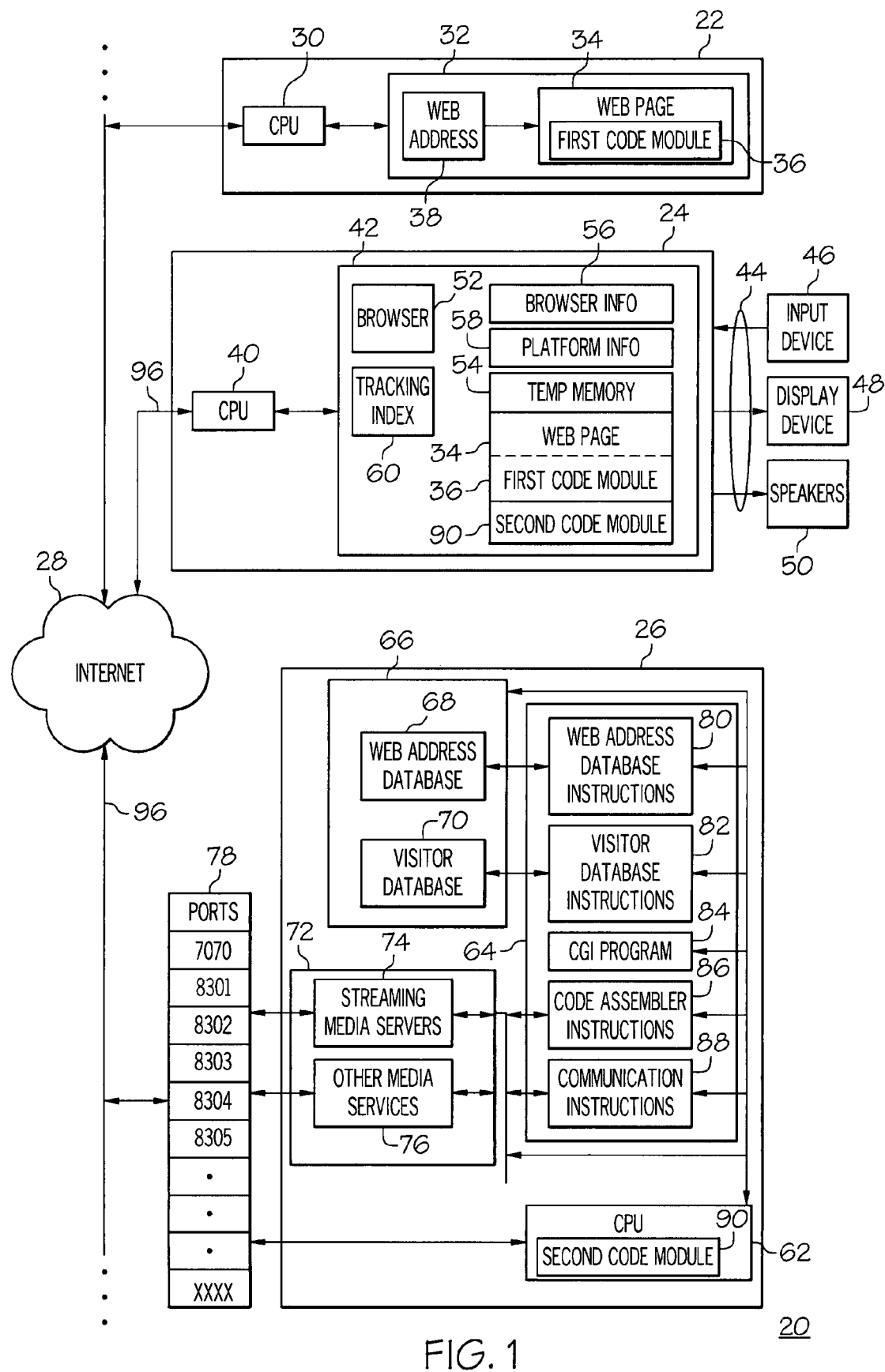
FIG. 1 shows a block diagram of a computer network in accordance with a preferred embodiment of the present invention.

FIG. 1 shows a block diagram of a computer network 20 in accordance with a preferred embodiment of the present invention. Computer network 20 includes a first processor platform 22, a second processor platform 24, and a server system 26. First processor platform 22, second processor platform 24, and server system 26 are connected together via a network 28. In a preferred embodiment, network 28 is the Internet. However, network 28 can also represent a LAN, a WAN, a wireless cellular network, or a combination of a wireline and wireless cellular network. It should be readily apparent to those skilled in the art that computer network 20 also includes many more processors and server systems which are not shown for the sake of clarity.

First processor platform 22 includes a central processing unit (CPU) 30 and a memory 32. Memory 32 includes a Web page 34 in which a first code module 36 is embedded. A Web address 38 in memory 32 is associated with Web page 34. In a preferred embodiment, Web page 34 is generated in Hyper-Text Markup Language (HTML). HTML is the authoring software language used on the Internet's World Wide Web for creating Web pages.

Web address 38 is a Universal Resource Locator (URL), or a string expression used to locate Web page 34 via network 28. It should be readily apparent to those skilled in the art that first processor platform 22 also includes additional components such as input/output lines, a keyboard and/or mouse, and a display terminal which are not shown for the sake of clarity. In addition, memory 32 also contains additional information, such as application programs, operating systems, data, etc., which also are not shown for the sake of clarity.

Second processor platform 24 includes a CPU 40, a memory 42, input/output lines 44, an input device 46, such as a keyboard or mouse, a display device 48, such as a display terminal, and speakers 50. Memory 42 includes Web browser software 52 and a temporary memory 54. A first portion of memory 42 is designated for browser information (BROWSER INFO.) 56, and a second portion of memory 42 is designated for platform information (PLATFORM INFO.) 58. In addition, a third portion of memory 42 is designated for a tracking index 60, or cookie, which will be discussed in detail below. Those skilled in the art will understand that memory 42 also contains additional information, such as application programs, operating systems, data, etc., which are not shown in FIG. 1 for the sake of clarity.

Web browser 52 is software which navigates a web of interconnected documents on the World Wide Web via Internet 28. When a Web site, such as Web page 34, is accessed through Web address 38, Web browser 52 moves a copy of Web page 34 into temporary memory 54. Web browser 52 uses HyperText Transfer Protocol (HTTP) for communicating over Internet 28. In a preferred embodiment, Web browser 52 supports the HyperText Markup Language 1.0 and the Javascript 1.0 standards, such as Netscape 2.0 and above, Internet Explorer 3.0, and above, and the like.

Browser information 56 is information specific to Web browser 52. Browser information 56 includes, for example, make and version of Web browser 52, what plug-ins are currently present, and so forth. Platform information 58 is information specific to second processor platform 24. Platform information 58 includes, for example, make and version of platform 24, make and version of the operating system operating on platform 24, and so forth.

Server system 26 includes a processor (CPU) 62, a memory 64, a database structure 66 having a Web address database 68 and a visitor database 70, and a server structure 72 for accommodating streaming media servers 74 and other media servers 76. Ports 78 are in communication with server structure 72 and Internet 28 and are used by the Transmission Control Protocol/Internet Protocol (TCP/IP) transport protocol for providing communication across interconnected networks, between computers with diverse hardware architectures, and with various operating systems.

Memory 64 includes Web address database instructions 80, visitor database instructions 82, a common gateway interface program 84, code assembler instructions 86, and communication instructions 88. Web address database instructions 80 are executed by processor 62 for maintaining and accessing Web address database 68. Likewise, visitor database instructions 82 are executed by processor 62 for maintaining and accessing visitor database 70. CGI interface program 84 executes functions at server system 26 including among other things, checking if Web site 34 is registered. Code assembler instructions 86 are executed by processor 62 to assemble a second code module 90 which is subsequently communicated to second processor platform 24 through the execution of CGI interface program 84 and communication instructions 88. Second code module 90 is communicated from ports 78 over Internet 28 and downloaded to temporary memory 54 at second processor platform 24.

FIG. 2 shows an example format of first code module 36 in accordance with the preferred embodiment of the present invention. First code module 36 is generated in HTML and embedded in the HTML of Web page 34 (FIG. 1) when a Web page developer designs Web page 34. In a preferred embodiment, first code module 36 is generally distributable. That is, first code module 36 may be distributed via Internet 28, and copied and pasted into a Web page during Web page development. First code module 36 executes enough functionality to act as a "bootstrap loader" in order to load second code module 90 (FIG. 1) into temporary memory 54 (FIG. 1) of second processor platform 24 (FIG. 1) for subsequent execution.

A first command line (LINE NO. 1) 92 contains an exemplary initialization for a first command 93, i.e., a script, that will activate a Web address 94 for contacting server system 26 (FIG. 1) and calls CGI program 84 into execution. In addition, first command line 92 communicates Web address 38 to server system 26 via a network connection 96 (FIG. 1) over Internet 28. CGI program 84 executes multiple functions at server system 26. For example, CGI program 84 checks to see whether or not Web page 34 is registered. In addition CGI program 84 initiates the downloading of second code module 90 to second processor platform 24. A second command line (LINE NO. 2) 98 terminates the script started in first command line 92.

A third command line (LINE NO. 3) 100 starts a new script. Third command line 100 also contains a comment tag 102 used to allow Web browser 52 to ignore a fourth command line (LINE NO. 4) 104. Fourth command line 104 contains a second command 106 that initiates execution of second code module 90 that was downloaded to temporary memory 54 of second processor platform 24. A fifth command line 108 terminates comment tag 102 and terminates the script begun on third command line 100.

Figure 3:
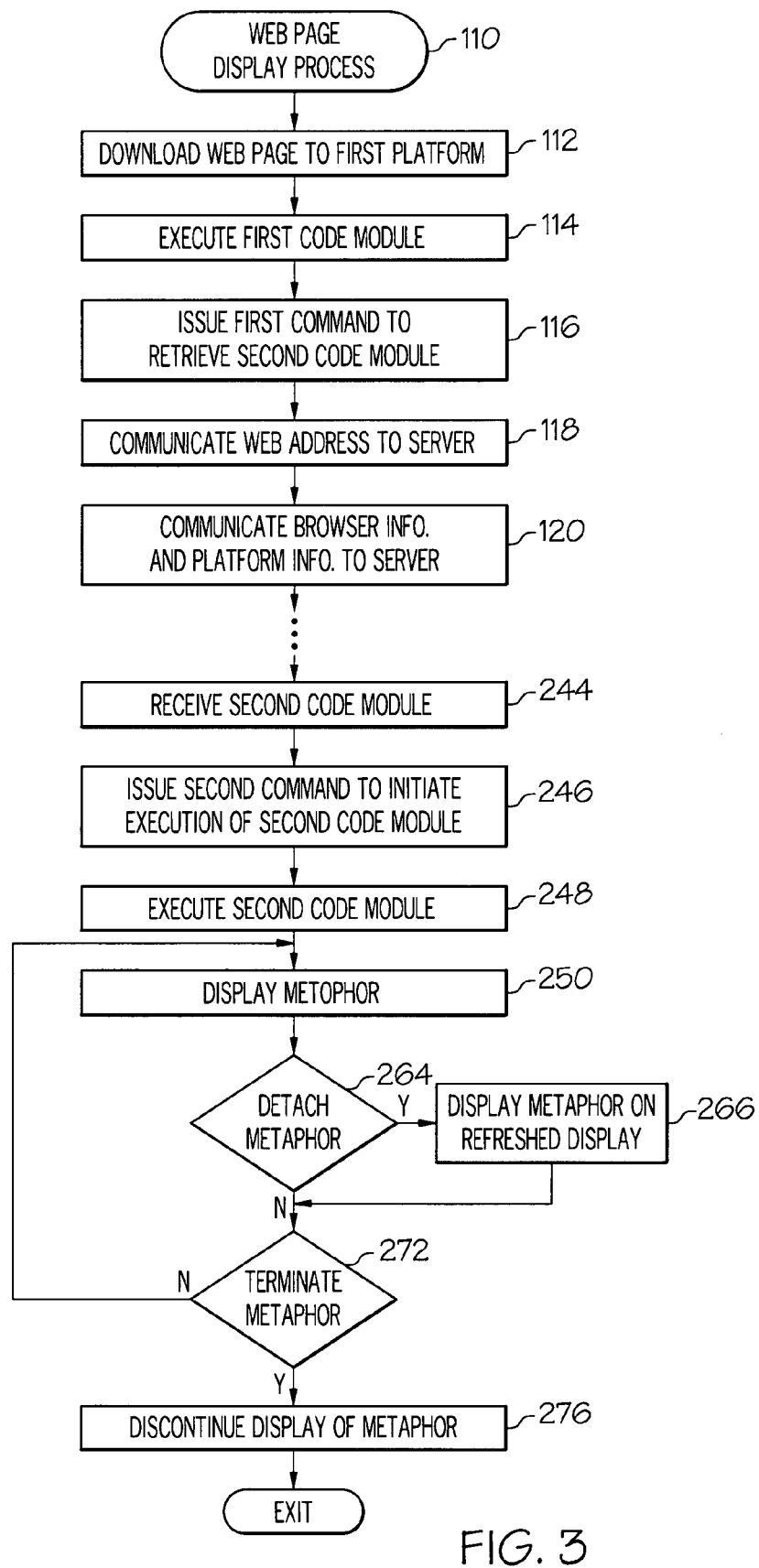
FIG. 3 shows a flow chart of a Web page display process.

FIG. 3 shows a flow chart of a Web page display process 110. Web page display process 110 is performed by second processor platform 24 to add function, such as streaming media or other media services to Web page 34 when downloaded to second processor platform 24.

Figure 4:
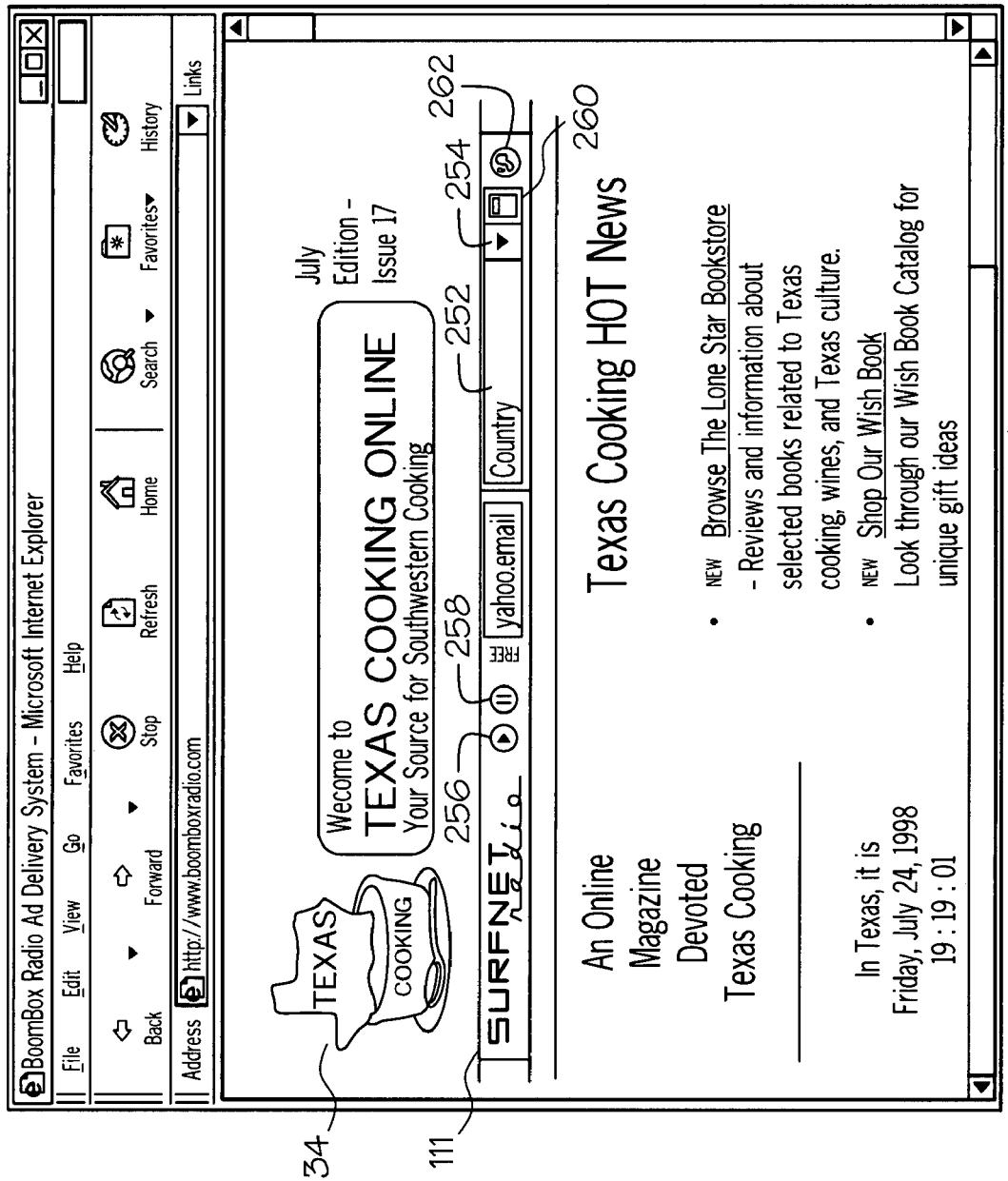
FIG. 4 shows an electronic display presenting a Web page including a media appliance metaphor.

With reference to FIG. 4, FIG. 4 shows display device 48 (FIG. 1) presenting Web page 34 with added function, namely with the added function of a media appliance metaphor 111 in response to the activities carried out in connection with Web page display process 110.

Media appliance metaphor 111 is a software device that exists in the realm of electronic communication and has a counterpart in the real world. When displayed with Web page 34 on display device 48 of second processor platform 24, media appliance metaphor 111 is a graphic representation of something that looks and behaves like a media appliance. In the exemplary embodiment, media appliance metaphor 111 represents a radio image. Other examples of media appliance metaphors include television images, computer images, computer game toy images, and so forth. When applied to Web page 34, media appliance metaphor 111 gives the visitor to Web page 34 the impression that they already know how to use the device because it looks and acts like something that they are already familiar with.

Metaphors take any form desired for which practical programming constraints can be met. This includes, but is not limited to interactive video games, network games, network information appliances such as web based telephones or call centers, and notification service appliances, like beepers. First code module 36 (FIG. 1) used to apply the metaphor on a Web page is a universal program interface, and acts as a bootstrap loader capable of retrieving and executing programs suitable for such a purpose.

Although the present invention is described in connection with the presentation of media appliance metaphor 111 as applied to Web page 34, it need not be limited to such a media appliance metaphor. Rather, first code module 36 (FIG. 2) can be embedded in a Web page to be executed by a visiting processor platform in order to execute other code modules not associated with media appliance metaphors.

With reference back to FIG. 3, Web page display process 110 begins with a task 112. Task 112 causes Web browser 52 to download Web page 34 at second processor platform 24. In other words, Web browser 52 moves a copy of Web page 34, with the embedded first code module 36 into temporary memory 54 (FIG. 1) of second processor platform 24.

When Web page 34 is downloaded at second processor platform 24 in task 112, a task 114 is performed. Task 114 causes Web browser 52 to automatically execute first code module 36 embedded in Web page 34, a copy of which is now stored in temporary memory 54.

Following task 114, a task 116 is performed. At task 116, first code module 36 executes first command line 92 (FIG. 2) to retrieve second code module 90 by issuing first command 93 to activate Web address 94, contact server system 26 (FIG. 1), and call CGI program 84 into execution.

A task 118 is performed in connection with task 116. Task 118 causes second processor platform 24 to communicate Web address 38 to server system 26 through the execution of first command line 92, as discussed previously.

Next, a task 120 is performed. Like task 118, task 120 causes second processor platform 24 to communicate browser information 56 (FIG. 1) and platform information 58 (FIG. 1), through the execution of first command line 92, to server system 26. Following task 120, second processor platform 24 performs additional activities (not shown) pertinent to the downloading and presentation of Web page 34 on display device 48 (FIG. 1). Furthermore, as indicated by ellipses following task 120, and relevant to display process 110, second processor platform 24 awaits communication from server system 26 before display process 110 can proceed.

Figure 5:
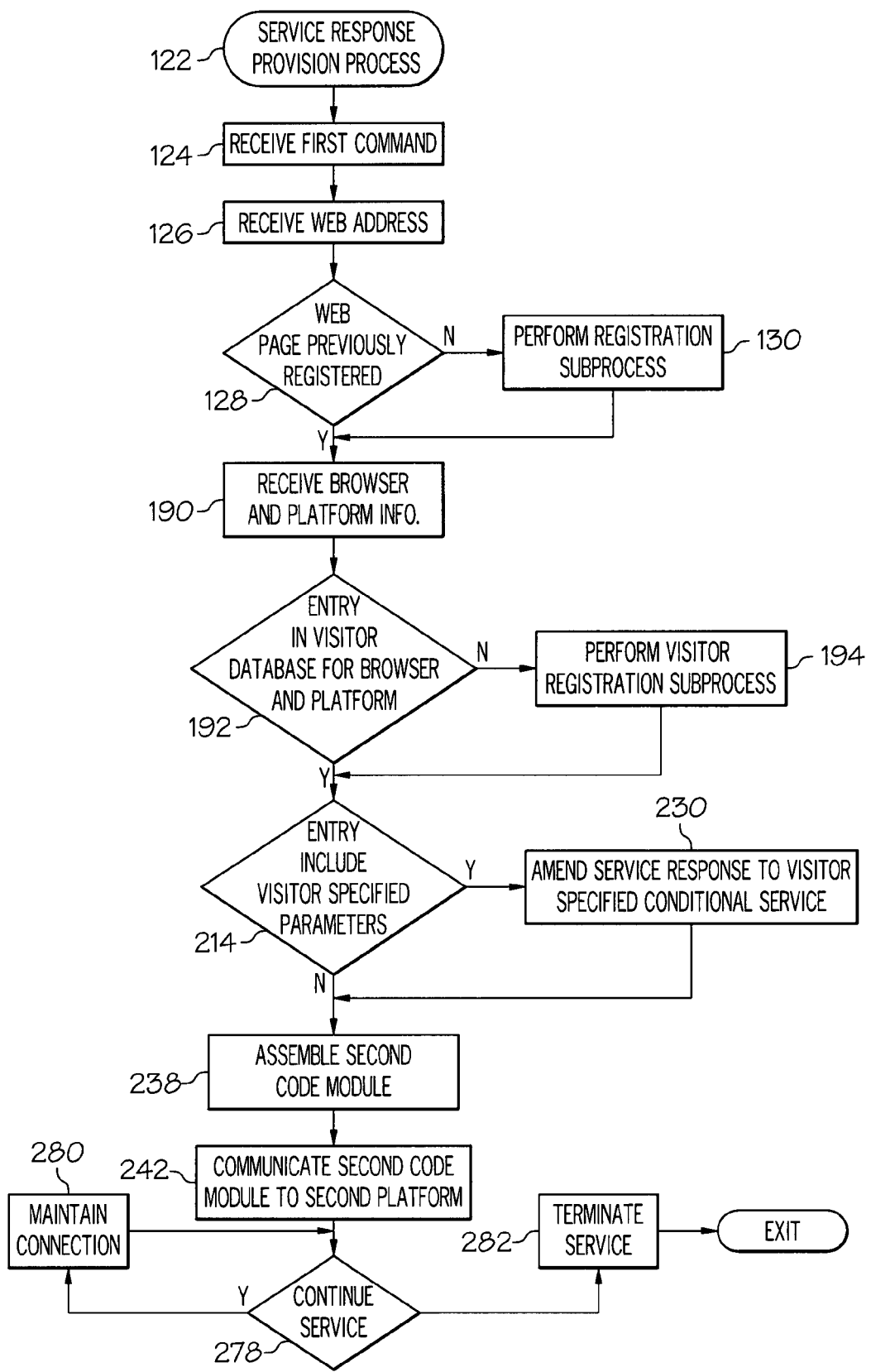
FIG. 5 shows a flow chart of a service response provision process.

FIG. 5 shows a flow chart of a service response provision process 122 performed by server system 26 (FIG. 1) in response to display process 110 (FIG. 3). Process 122 begins with a task 124. Task 124 causes processor 62 (FIG. 1) of server system 26 to receive first command 93 (FIG. 3).

In response to receipt of first command 93 in task 124, a task 126 is performed. At task 126, server system 26 receives Web address 38 communicated by second processor platform 24 at task 118 (FIG. 3) of display process 110 (FIG. 3).

Following task 126, a query task 128 is performed. At query task 128, server system 26 determines if Web page 34 located by Web address 38 is previously registered. That is, processor 62 executes a portion of Web address database instructions 80 to access Web address database 68 in order to locate an entry in Web address database 68 corresponding to Web address 38.

When processor 62 determines that there is no entry in Web Address database 68 for Web address 38, process 122 proceeds to a task 130. Task 130 causes processor 62 of server system 26 to perform a registration subprocess.

Figure 6:
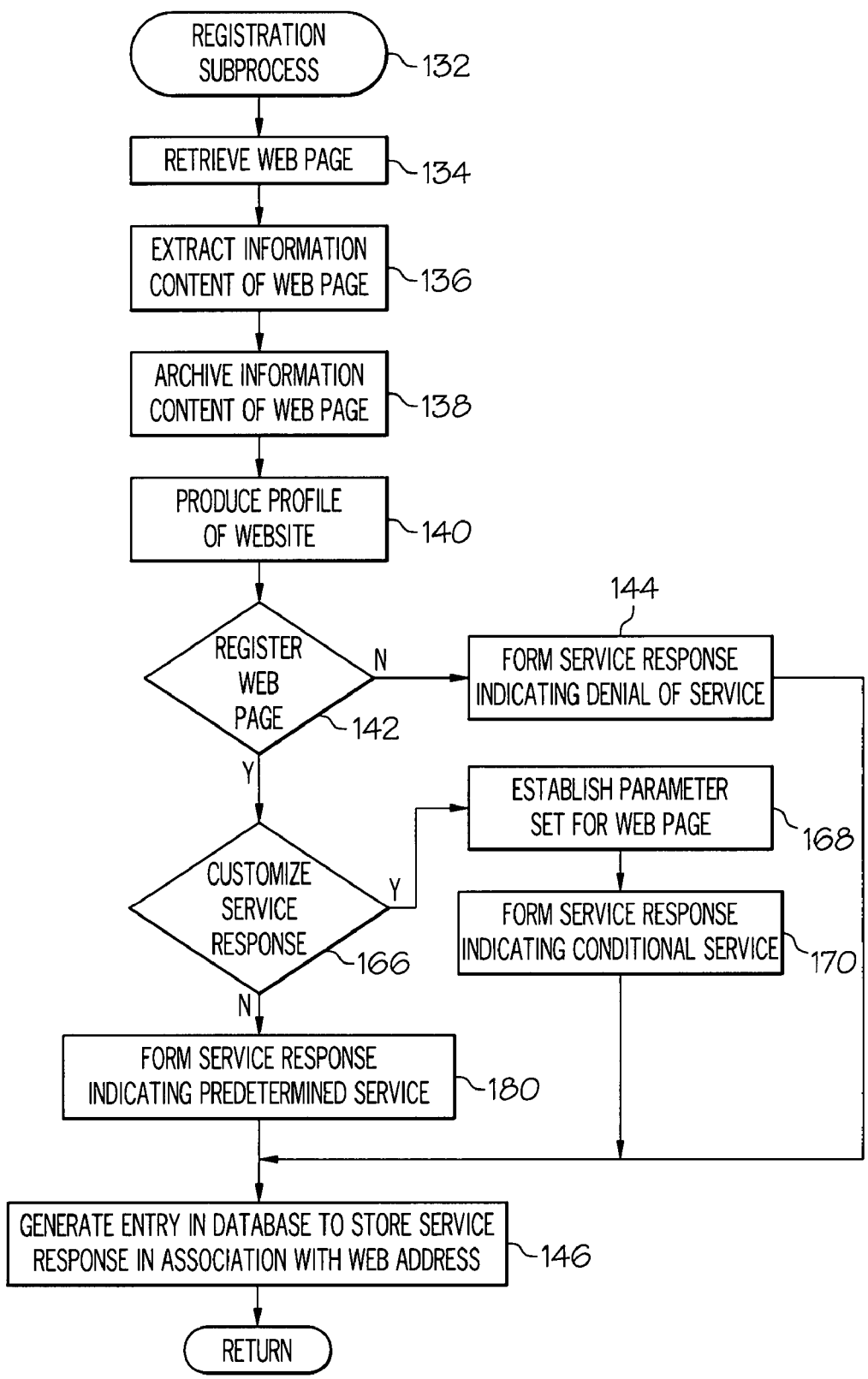
FIG. 6 shows a registration subprocess of the service response provision process.

FIG. 6 shows a registration subprocess 132 performed in response to task 130 of service response provision process 122 (FIG. 4). Registration subprocess 132 is performed by server system 26 to register Web page 34 with the controlling entity of server system 26. In addition, registration subprocess 132 is performed to determine a service response (discussed below) for Web page 34.

Registration subprocess 132 is performed automatically the first time that Web page 34 is downloaded at a processor platform. Desirably, registration subprocess 132 is invoked immediately following the design of Web page 34 by a Web page developer. For example, following the design of Web page 34, the Web page developer may download Web page 34 at a processor platform to review the graphical, textual, and audio content of Web page 34 before Web page 34 becomes generally accessible by visitors.

When query task 128 determines that there is no entry in Web address database 68 for Web address 38 (FIG. 1), server system 26 may schedule a time to perform registration subprocess 132. Alternatively, registration subprocess 132 may be performed at task 130 (FIG. 4) immediately upon acknowledgment that there is no entry in Web address database 68 (FIG. 1).

Registration subprocess 132 begins with a task 134. Task 134 causes server system 26 (FIG. 1) to retrieve Web page 34. Task 134 may also causes server system 26 to retrieve Web pages (not shown) that are nested in association with Web page 34.

In response to task 134, a task 136 is performed. Task 136 causes processor 62 of server system 26 execute a portion of Web address database instructions 80 to extract information content of Web page 34. The information content of Web page 34 is derived from all characters and words that are written on Web page 34, and that are publicly accessible. The information content may then be reduced by extracting informational metatags, or HTML tags, embedded in Web page 34 that are used to specify information about Web page 34. In particular, the "keyword" and "description" metatags usually contain words and description information that accurately describe Web page 34. Other informational content which may be extracted are links, other URLs, domain names, domain name extensions (such as .com, .edu., .jp, .uk, etc.), and so forth.

Following task 136, a task 138 is performed. Task 138 causes processor 62 to archive the information content described in connection with task 136.

In response to extraction task 136 and archival task 138, a task 140 is performed. Task 140 causes processor 62 (FIG. 1) executing Web address database instructions 80 to produce a particular "signature" or profile of Web page 34. This profile is important for determining the nature of the interest by a visitor using second processor platform 24 to display Web page 34 from whence the profile is produced in order to perform a service response (discussed below) related to the profile.

Following task 140, a query task 142 is performed. Query task 142 determines whether or not Web page 34 can be registered. Processor 62 (FIG. 1) may determine that Web page 34 cannot be registered if the information content of Web page 34 is objectionable or otherwise unacceptable to be displayed with added function, i.e., media appliance metaphor 111 (FIG. 4). When query task 142 determines that Web page 34 is not to be registered, subprocess 132 proceeds to a task 144.

Task 144 causes processor 62 (FIG. 2) to form a service response indicating a denial of service. In a preferred embodiment, a desired service response is media appliance metaphor 111 functioning to provide streaming media, in this case music, along with Web page 34. However, with respect to task 144, the service response indicating denial of service may be the media appliance metaphor 111 having a slash through it. Alternatively, the service response may simply be an absence of any media appliance metaphor. Following task 144, subprocess 132 proceeds to a task 146.

Referring to FIG. 7 in connection with task 146, FIG. 7 shows Web address database 68 of server system 26 (FIG. 1). Web address database 68 includes as a minimum, a Web address field 150, a Web page profile field 152, a service response field 154, and a parameter set field 156. Task 146 (FIG. 6) causes processor 62 (FIG. 1) to generate an entry, for example, a first exemplary entry 158, in Web address database 68. Web address field 150 is designated for a Web address, or URL. Profile field 152 contains the profile of the Web address produced in task 140 (FIG. 6) of registration subprocess 132. Service response field 154 is designated for a service response, and parameter set field 156 is designated for parameters used to assemble second code module 90 having the desired service response.

First entry 158 generated in response to task 144 (FIG. 6) includes Web address 38 identified simply as URL 1 in Web address field 150, a profile 160 in profile field 152 associated with URL 1 indicates Web page 34 as being directed toward RECREATION/GOLF. A service response 162 related to profile 160 indicating a denial of service is stored in service response field 154 for entry 158, and a denial content parameter set 164 associated with service response 162 are used to form an audible, visual, or other presentation of denial service response 162.

Referring back to query task 142 (FIG. 6) of registration subprocess 132, when query task 142 determines that Web page 34 is registered, subprocess 132 proceeds to a query task 166. At query task 166, processor 62 (FIG. 1) may execute a portion of Web address database instructions 80 to determine if a service response for Web page 34 is to be customized. That is, the Web page developer of Web page 34 has the option of customizing media appliance metaphor 111 (FIG. 4). Such customization may include, but is not limited to music formats tailored to fit the profile, or personality, of Web page 34, the appearance of metaphor 111, the names and formats of the radio channels, the banners that are displayed, the specific type of informational feeds, and so forth.

When processor 62 determines that the service response is to be customized, subprocess 132 proceeds to a task 168. At task 168, processor 62 (FIG. 1) establishes a parameter set for customization of media appliance metaphor 111 to be applied to Web page 34. The custom metaphor is defined by the parameter set. Establishment of the parameter set may be performed through a query exercise performed between server system 26 and the Web page developer of Web page 34. Customization can include references to commercials targeted to Web page 34, custom configuration data, custom Web page metaphor preferences, Web page owner preferences, and so forth.

In response to task 168, a task 170 is performed. Task 170 causes processor 62 to form a service response indicating conditional service, i.e., presentation of media appliance metaphor 111 that has been customized as a result of the activities associated with task 168. Following task 170, registration subprocess 132 proceeds to task 146 for generation of an entry in Web address database 68 (FIG. 7) to store the service response in association with the Web address.

Referring momentarily to FIG. 7, Web address database 68 includes a second exemplary entry 172. Second entry 172 generated in response to task 170 (FIG. 6) includes a Web address 38 in Web address field 150 identified simply as URL 2. A profile 174 in profile field 152 associated with URL 2 indicates Web page 34 as being directed toward TEXAS COOKING. A service response 176 related to profile 174 indicating conditional service is stored in service response field 154 for entry 172, and a conditional content parameter set 178 associated with conditional service response 176 is used to form an audible, visual, or other presentation of conditional service response 176.

With reference back to registration subprocess 132 (FIG. 6), when processor 62 determines at query task 166 the service response is not to be customized, registration subprocess 132 proceeds to a task 180. Task 180 causes processor 62 to form a service response indicating a predetermined, or default, service. Such a service response is determined by the entity controlling server system 26 (FIG. 1). In task 180, the controlling entity can determine the look and feel of media appliance metaphor 111 (FIG. 4), the particular audio format to be used with media appliance metaphor 111, for example a particular music type, the controls available to a visitor to Web page 34, and so forth.

Following task 180, subprocess 132 proceeds to task 146 where an entry is generated in Web address database 68 (FIG. 7) to store the service response in association with the web address. Again referring to Web address database 68 (FIG. 7), Web address database 68 includes a third exemplary entry 182. Third entry 182, generated in response to task 180 (FIG. 6), includes Web address 38 in Web address field 150 identified simply as URL 3. A profile 184 in profile field 152 associated with URL 3 indicates Web page 34 as being directed toward WEDDING. A service response 186 indicating a predetermined service is stored in service response field 154 for entry 182, and a predetermined content parameter set 188 associated with service response 186 is used to form an audible, visual, or other presentation of predetermined service response 186.

Following task 146 and the formation of service response 162 indicating denial of service, the formation of service response 176 indicating conditional service, or the formation of service response 186 indicating predetermined service, Web page 34 is registered, and subprocess 132 exits.

Referring back to service response provision process 122 (FIG. 5) following task 130 in which registration subprocess 132 (FIG. 6) has been performed, or when query task 128 determines that Web page 34 (FIG. 1) identified by Web address 38 (FIG. 1) has been previously registered, provision process 122 continues with a task 190.

Task 190 causes processor 62 (FIG. 1) to receive browser information 56 (FIG. 1) and platform information 58 (FIG. 1) from second processor platform 24 (FIG. 1). As discussed previously, browser information 56 includes, for example, make and version of Web browser 52, what plug-ins are currently present, and so forth. Platform information 58 includes, for example, make and version of platform 24, make and version of the operating system operating on platform 24, and so forth.

In response to task 190, a query task 192 is performed. Query task 192 causes processor 62 to execute a portion of visitor database instructions 82 (FIG. 1) to determine if there is an entry in visitor database 70 related to browser information 56 and platform information 58. When query task 192 determines that there is no entry in visitor database 70, indicating that a user of second processor platform 24 has not previously downloaded a Web page containing first code module 36, provision process 122 proceeds to a task 194.

Task 194 causes processor 62 to further execute visitor database instructions 82 to perform a visitor registration subprocess. FIG. 8 shows a visitor registration subprocess 196 of service response provision process 122. Visitor registration subprocess 196 is performed for tracking visitors to Web page 34. Visitor registration subprocess 196 generates visitor database 70 containing visitor demographics and interests that may be useful for targeting advertising and tailoring added function to Web pages.

Visitor registration subprocess 196 begins with a task 198. Task 198 causes server system 26 (FIG. 1) to apply tracking index 60 to second processor platform 24 via network connection 96. Tracking index 60, also known as a cookie, is a feature of HTTP that allows the entity controlling server system 26 to place information in memory 42 (FIG. 1) of second processor platform 24. Tracking index 60 allows server system 26 to both store and retrieve information on second processor platform 24. Tracking index 60 is persistent, meaning it remains in memory 42 (FIG. 1) of second processor platform 24 for subsequent use by server system 26. Since tracking index 60 is persistent, tracking index 60 can be used by server system 26 to track a visitor, using second processor platform 24, to any Web page that has embedded therein first code module 36.

In connection with task 198, a task 200 is performed. Task 200 causes processor 62 (FIG. 1) to generate an entry in visitor database 70 to store browser information 56 and platform information 58 in association with tracking index 60. Following task 200, visitor registration subprocess exits.

FIG. 9 shows visitor database 70 generated by server system 26 of computer network 20. Visitor database 70 includes as a minimum, a tracking index field 202, a browser ID field 204, a platform ID field 206, and a visitor preferences field 208. Task 200 (FIG. 8) causes processor 62 (FIG. 1) to generate a visitor database entry 210, in visitor database 70. Tracking index field 202 is designated for a tracking index, or cookie, such as tracking index 60 identifying second processor platform 24. Browser ID field 204 contains browser information 56 received in task 190 (FIG. 5) of provision process 122. Likewise, platform ID field 206 is designated for platform information 58 received in task 190. Visitor preferences field 208 is designated for an optional visitor specified parameter set 212 assembled in response to a visitor pre-registration process (discussed below).

Referring back to service response provision process 122 (FIG. 5), following task 194 in which visitor registration subprocess 196 is performed or when query task 192 determines that entry 210 (FIG. 9) is present in visitor database 70, process 122 proceeds to a query task 214.

Query task 214 determines if entry 210 includes visitor specified parameter set 212. As mentioned previously, visitor specified parameter set 212 may be present if second processor platform has previously performed a visitor pre-registration process.

Figure 10:
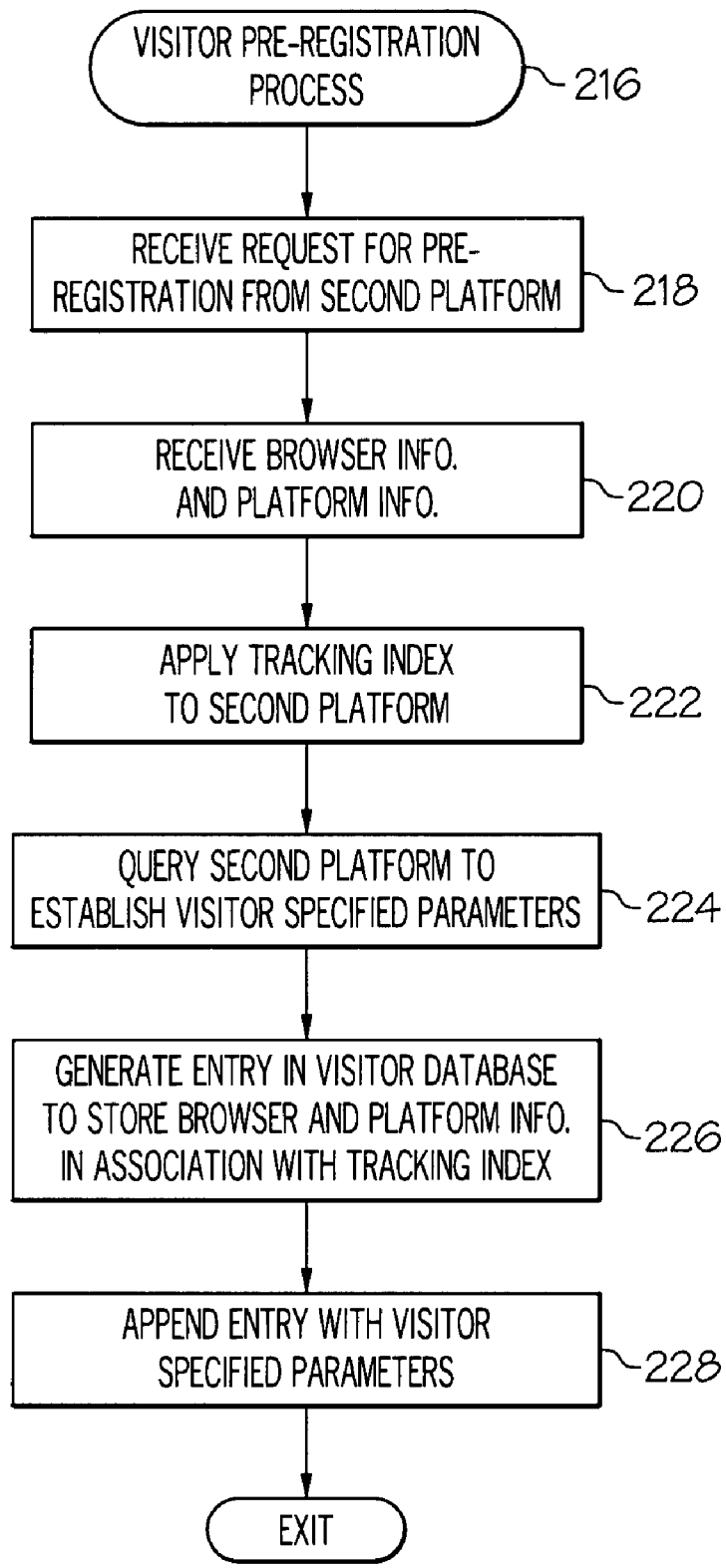
FIG. 10 shows a visitor pre-registration process performed prior to the Web page display process of FIG. 3.

FIG. 10 shows a visitor pre-registration process 216 performed prior to invoking Web page display process 110 (FIG. 3). Visitor pre-registration process 216 may be performed by a user of second processor platform 24 (FIG. 1) via an access account (not shown). Visitor pre-registration process 216 allows users to have some preference control over any added function, such as media appliance metaphor 111 (FIG. 4) that they may encounter when downloading Web pages having first code module 36 embedded therein.

Visitor pre-registration process 216 begins with a task 218. Task 218 causes processor 62 (FIG. 1) of server system 26 to receive a request (not shown) to pre-register from second processor platform 24. Such a request may be received over a communication link, such as network connection 96, via Internet 28, following the assignment of an access account to second processor platform 24.

In connection with task 218, a task 220 is performed. Task 220 causes processor 62 to receive browser information 56 and platform information 58 from second processor platform 24 via network connection 96.

Following task 220, a task 222 is performed. In a manner similar to task 198 of visitor registration process 196 (FIG. 8), server system 26 applies a tracking index or cookie, such as tracking index 60, to second processor platform 24.

Next a task 224 is performed. In task 224, processor 62 and second processor platform 24 perform an interactive process to obtain visitor specified parameters for establishing visitor specified parameter set 212 (FIG. 9). Such visitor specified parameters may include, for example, the appearance of specified metaphors, specific audio channels, format preferences, such as location on the Web page, size, color, and so forth.

Following task 224, a task 226 is performed. Task 226 causes processor 62, through the execution of visitor database instructions 82 (FIG. 1), to generate an entry, such as entry 210 (FIG. 9) in visitor database 70 to store browser information 56 and platform information 58 in association with tracking index 60.

In addition a task 228 is performed in connection with task 226. Task 228 causes processor 62, executing visitor database instructions 82, to append entry 210 with visitor specified parameter set 212, as illustrated in visitor database 70 (FIG. 9). Following task 228, visitor pre-registration process 216 exits.

Referring back to query task 214 of service response provision process 122 (FIG. 5), when processor 62 determines that entry 210 (FIG. 9) includes visitor specified parameter set 212 obtained through the execution of visitor pre-registration process 216 (FIG. 10), process 122 proceeds to a task 230.

Task 230 causes processor 62 to access Web address database 68 to amend a service response in service response field 154 (FIG. 7) to indicate a visitor specified conditional service is to be provided for second processor platform 24. Referring momentarily to Web address database 68 (FIG. 7), database 68 includes a fourth exemplary entry 232 for a Web address 38 identified simply as URL 4 in Web address field 150, a profile 234 in profile field 152 associated with URL 4 indicates Web page 34 as being directed toward FOOTBALL. Service response 186 indicating predetermined service is entered in service response field 154 for fourth entry 232, and predetermined content set 188 associated with service response 186 is entered in parameter set field 156.

In response to task 230, service response field 154 also includes a flag 236 associated with tracking index 60 indicating that predetermined service response 186 is amended to conditional service response 176 for second platform 24. Flag 236 indicates to processor 62 to access visitor preferences field 208 (FIG. 9) of visitor database 70 for visitor specified parameter set 212. Although, fourth exemplary entry 232 is shown having a predetermined service response 186, it should be readily understood that the service response may be a conditional response 176 (FIG. 7) in which the Web page designer has customized metaphor 111 (FIG. 4) during registration subprocess 132 (FIG. 6).

With reference back to process 122 (FIG. 5) following task 230 or when query task 214 determines that entry 210 (FIG. 9) of visitor database 70 does not include visitor specified parameter set 212, process 122 proceeds to a task 238.

Task 238 causes processor 62 to execute code assembler instructions 86 (FIG. 1) to assemble second code module 90. Second code module 90 is assembled by accessing the predetermined one of denial of service response 162 (FIG. 7), conditional service response 176 (FIG. 7), and predetermined service response 186 (FIG. 7) from Web address database 68. In addition, second code module 90 is assembled in response to browser information 56 and platform information 58. In other words, second code module 90 is assembled to include the service response and to work with any combination of browser/platform systems.

This feature eliminates the need for an affiliate program to be hard coded, installed onto Web page 34, then tested and debugged by programmers. In addition, since second code module 90 is assembled in response to browser information 56, second code module 90 is compatible with Web browser 52 (FIG. 1) used by second processor platform 24 (FIG. 1).

Second code module 90 may also include another Web address 240, represented in parameter set field 156 of second entry 175 of Web address database 68 (FIG. 7). In this exemplary scenario, the media source (audio, video, graphics, banners, informational feed, etc.) originates from a platform (not shown) connected through Internet 28 (FIG. 1) whose location is specified by Web address 240.

Following assembly of second code module 90 in task 238, a task 242 is performed by server system 26. Task 242 causes processor 62 through the execution of CGI program 84 (FIG. 1), to communicate second code module 90 to second processor platform 24 via network connection 96. In addition, through the execution of communication instructions 88 (FIG. 1) and the execution of appropriate command and control protocols, processor 62 manages servers 72 (FIG. 1) in order to direct information content from the media source having Web address 240 to second processor platform 24.

Referring to Web page display process 110 (FIG. 3), display process 110 performs a task 244. Task 244 is complementary to task 242 of provision process 122. That is, as server system 26 communicates second code module 90 to second processor platform 24, task 244 causes platform 24 to receive, via network connection 96 (FIG. 1), second code module 90. Second code module is subsequently stored in temporary memory 54 (FIG. 1) of second processor platform 24.

Following receipt of second code module 90, process 110 proceeds to a task 246. Task 246 causes Web browser 52 (FIG. 1) to execute third command line 100 (FIG. 2) of first code module 36 containing comment tag 102. In addition, task 246 causes Web browser 52 to execute fourth command line 104 (FIG. 2) of first code module 36 issuing second command 106 to initiate the execution of second code module 90.

In response to issuing second command 106 in task 246, a task 248 is performed. Task 248 causes Web browser 52 to execute second code module 90.

In response to task 248, a task 250 is performed. Task 250 causes media appliance metaphor 111 (FIG. 4) to be applied to Web page 34 for display at display device 48 (FIG. 1). Of course, as discussed previously, if the service response is denial of service response 162, media appliance metaphor 111 may be presented with a slash through it or may be absent from Web page 34.

Referring to FIG. 4, the service response is media appliance metaphor 111 presenting a radio image. Through media appliance metaphor 111, streaming audio in the form of a radio channel 252 playing country music is provided and presented through speakers 50 (FIG. 1). Country radio channel 252 enhances the appeal of Web page 34 through an audio experience that compliments Web page 34 whose information content involves Texas Cooking. In connection with music provided through radio channel 252, commercials may be aired that are related to the information content of Web page 34. Such commercials may include content relevant to Texas cooking, for example, food items, antacids, barbecues, and so forth. Thus, metaphor 111 is able to deliver targeted advertising to a visitor accessing Web page 34.

Metaphor 111 also includes additional controls. For example, a drop down menu 254 is provided for selection of a different radio channel. In addition, a control button 256 allows a user to forward and reverse radio channel 252, another control button 258 allows a user to play or pause radio channel 252, and a volume slide 260 allows a user to adjust the volume of radio channel 252. An arrow image 262 included in metaphor 111 activates a portable mode (discussed below).

In response to the display of metaphor 111 in task 250, a query task 264 is performed. Query task 264 causes second processor platform 24, operating through Web browser 52, to determine if a command is detected to detach metaphor 111 from Web page 34 in order to activate a portable mode. A portable mode may be selected when a user clicks on arrow image 262. When task 252 determines that the portable mode has been selected process 110 proceeds to a task 266.

Figure 11:
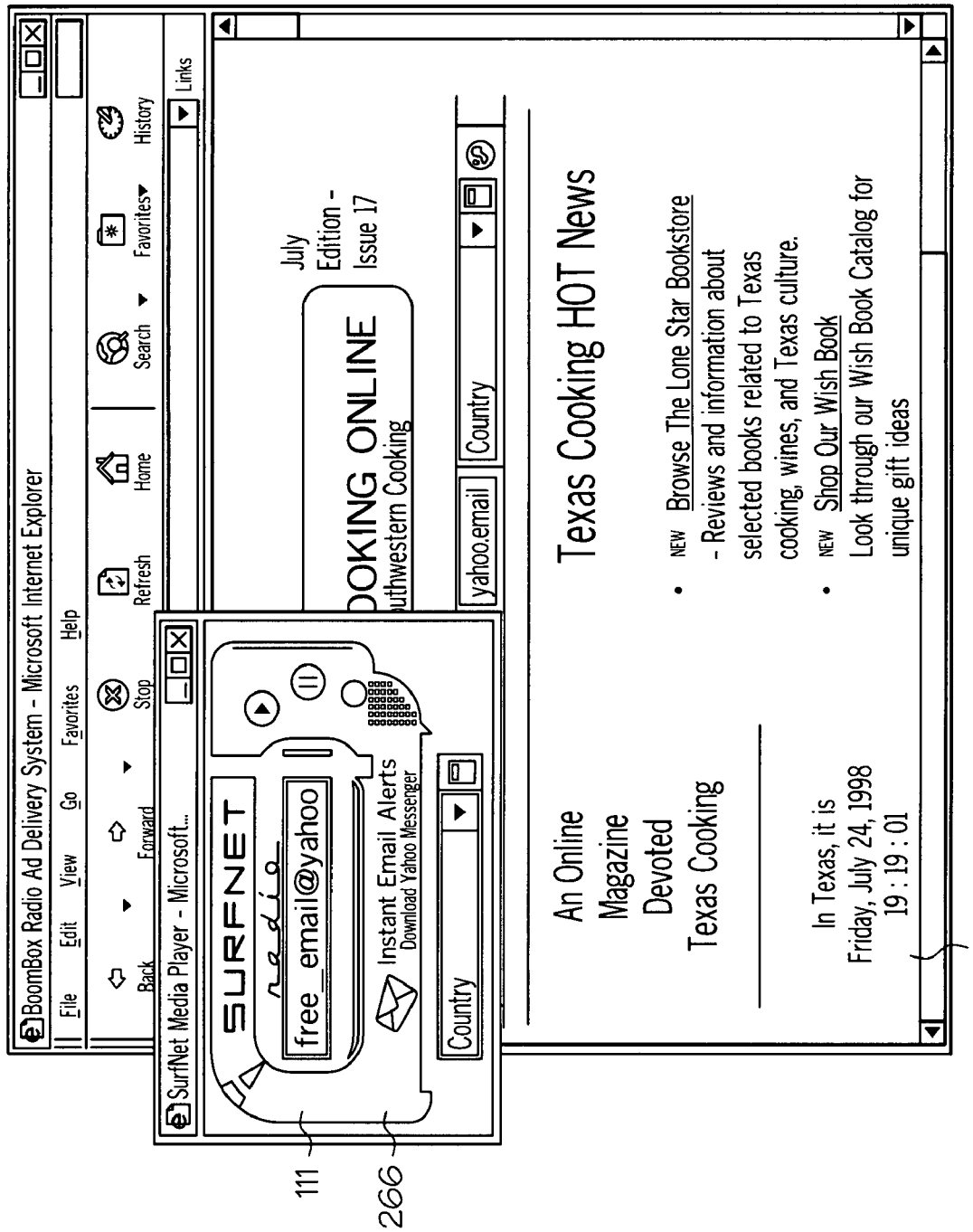
FIG. 11 shows the electronic display presenting the media appliance metaphor detached from the Web page.

Task 266 causes second processor platform 24 to display metaphor 111, in a portable mode, on a refreshed display. FIG. 11 shows electronic display 48 presenting media appliance metaphor 111 detached from the Web page 34 and appearing in a portable mode 268. In an exemplary embodiment, when arrow image 262 is clicked, metaphor 111 changes in appearance to portable mode 268. This change of appearance may reflect a predetermined response by server system 26 or visitor specified preferences set in visitor pre-registration process 216 (FIG. 10).

Figure 12:
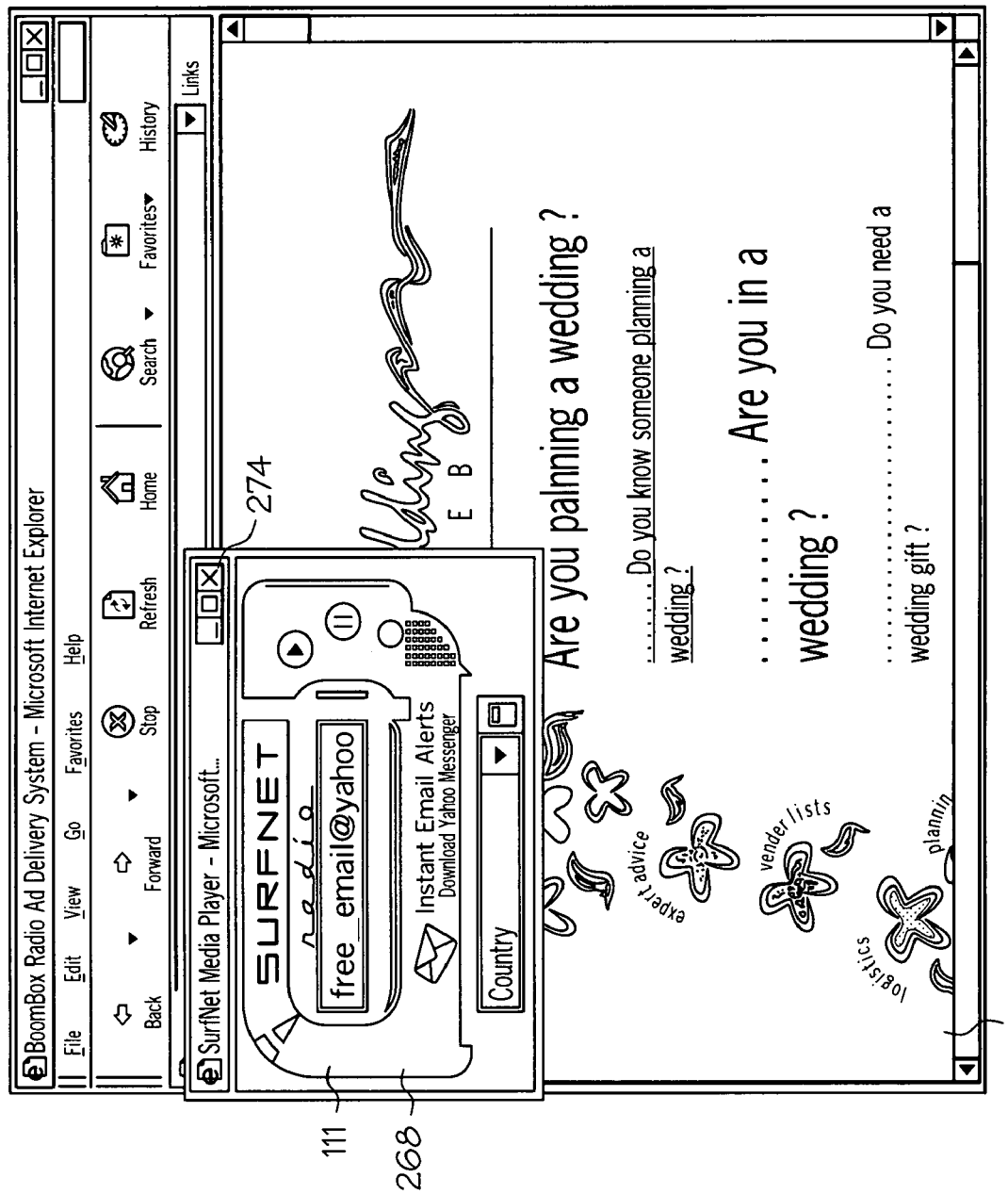
FIG. 12 shows the electronic display presenting another Web page including the media appliance metaphor.

FIG. 12 shows electronic display 48 presenting a new Web page 270 downloaded at second processor platform 24 and including media appliance metaphor 111 in portable mode 268. Thus, although Web page 34 (FIG. 11) is no longer being display on electronic display 48, a user of second processor platform is still able to enjoy the information content supplied by metaphor 111.

Following task 266 and when query task 264 determines that metaphor 111 is not to be detached from Web page 34, a query task 272 is performed. Query task 272 determines if display of metaphor 111 is to be terminated. Metaphor 111 may be terminated when a user of second processor platform 24 does not detach metaphor 111 from Web page 34 and downloads a subsequent Web page. In another exemplary scenario, second processor platform 24 may be voluntarily or involuntarily disconnected from server system 26 through the execution of fifth command line 108 (FIG. 2) of first code module 36 terminating second command 106 (FIG. 2). In yet another exemplary scenario, metaphor 111 may be terminated when in portable mode 268 by clicking on the close window control, such as an X symbol 274 (FIG. 12).

When query task 272 determines that metaphor 111 is not to be terminated, program control loops back to task 250 to continue display of metaphor 111. However, when query task 272 determines that metaphor 111 is to be terminated process 110 proceeds to a task 276.

Task 276 causes second processor platform 24 to discontinue the display of metaphor 111 on display device 48. Following task 276, process 110 exits.

Referring to service response provision process 122 (FIG. 5), processor 62 (FIG. 1) of server system 26 performs query task 278. Query task 278 is complementary to query task 272 of display process 110. That is, processor 62 monitors for the termination of metaphor 111 in query task 272 and determines at query task 278 whether service should continue.

Communication instructions 88 (FIG. 1) executed by processor 62 includes a timing parameter, or clock, (not shown) that is started to allow for a continuous periodic check for continuation of service. In query task 278, when service is to continue, process 122 proceeds to a task 280. Task 280 causes server system 26, through the continued execution of communication instructions 88 at processor 62, to continue directing streaming media associated with metaphor 111 to second processor platform 24. Following task 280, process 122 loops back to query task 278 to continue the periodic check for continuation of service.

When query task 278 determines that service is to be discontinued, process 122 proceeds to a task 282. Task 282 causes server system 26 to terminate services. That is, task 282 causes server system 26 to discontinue directing streaming media associated with metaphor 111 to second processor platform 24. Following task 282, process 122 exits.

In summary, the present invention teaches of a method and system for adding function, such as streaming media or other media services to a Web page, through the implementation of a simple code module embedded in the HTML of the Web page. The code module is compatible with Web browsers which adhere to the standards for HyperText Transfer Protocol (HTTP) because it is implemented using a common subset of the current HTML standard command set. In addition, the code module is easily distributed through the Internet, and is readily copied and pasted into a Web page during Web page development activities, and undergoes automatic execution and registration with minimal effort by the Web page developer. The present invention is able to tailor the added function based on information about the Web page in which it is embedded and based on visitor specified preferences.

Although the preferred embodiments of the invention have been illustrated and described in detail, it will be readily apparent to those skilled in the art that various modifications may be made therein without departing from the spirit of the invention or from the scope of the appended claims. The specification and drawings are, accordingly, to be regarded in an illustrative rather than restrictive sense. Furthermore, although the present invention is described in connection with a media appliance metaphor for providing streaming audio, this is not intended to be limiting. For example, the metaphor may providing streaming video and other multimedia communication formats.

What is claimed is:

1. A method of operating a computer network to add function to a representation of a web page comprising:
   downloading said representation of said web page at a processor of a client computer, said downloading operation being performed by said processor;
   when said web page is downloaded, said processor automatically executing a first code module associated with said web page, wherein execution of said first code module initiates retrieval of a second code module;
   receiving, at a server system, information from said processor;
   providing, from said server system, said second code module having a service response, said service response being formed in response to said information;
   downloading said second code module to said processor; and
   said processor initiating execution of said second code module at said processor, wherein said second code module includes a web address for a second web page, and said method further comprises:
   downloading information content from said second web page at said processor in response to said execution of said second code module; and
   presenting said information content in said service response at said processor.

2. A method as claimed in claim 1 wherein said information received at said server system characterizes said processor.

3. A method as claimed in claim 1 further comprising:
obtaining informational content of said web page at said server system; and
determining said service response related to said informational content.

4. A method as claimed in claim 1 further comprising:
storing, at said server system, said service response in association with a web address of said web page; and
said providing operation accesses said service response associated with said web address so that said service response is included in said second code module.

5. A method as claimed in claim 1 further comprising:
presenting said service response at said processor in response to said initiating operation; and
terminating said presenting operation upon detection, at said server system, of a terminate service response indicator from said processor.

6. A method of operating a computer network to add function to a representation of a web page comprising:
downloading said representation of said web page at a processor of a client computer, said downloading step being performed by said processor;
when said representation of said web page is downloaded, said processor automatically executing a first code module associated with said web page;
said first code module issuing a first command to retrieve a second code module;
assembling, in response to said issuing operation, said second code module having a service response;
said first code module issuing a second command to initiate execution of said second code module; and
said processor initiating execution of said second code module in response to said second command; and
downloading information content from a second web page at said processor when said second code module is executed, said second code module including a web address for said second web page; and
presenting said information content in said service response at said processor.

7. A method as claimed in claim 6 further comprising:
presenting said service response at said processor in response to said initiating operation; and
terminating said presenting operation upon detection, at a server system, of a terminate service response indicator from said processor.

8. A method of operating a computer network to add function to a representation of a web page comprising:
downloading said representation of said web page at a processor, said downloading step being performed by said processor;
when said web page is downloaded, said processor automatically executing a first code module associated with said web page;
said first code module issuing a command to retrieve a second code module;
assembling, in response to said issuing operation, said second code module having a service response, said service response being a metaphor;
said processor executing said second code module at said processor;
displaying said metaphor in connection with said representation of said web page at said processor;
detaching said metaphor from said representation of said web page; and
displaying said metaphor disassociated from said representation of said web page.

9. A method as claimed in claim 8 further comprising customizing said metaphor to include a parameter set relevant to said web page, said customized metaphor describing a conditional service presented upon execution of said second code module.

* * * * *